US008845401B2

(12) United States Patent
De Vos et al.

(10) Patent No.: US 8,845,401 B2
(45) Date of Patent: Sep. 30, 2014

(54) METHOD AND APPARATUS FOR PROCESSING POULTRY OR A PART THEREOF

(75) Inventors: Ferdinand Allard De Vos, Oostzaan (NL); Pieter Willem Vonk, Oostzaan (NL); Martinus Casper Melchior Balthasar Waasdijk, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 815 days.

(21) Appl. No.: 12/560,698

(22) Filed: Sep. 16, 2009

(65) Prior Publication Data

US 2010/0081366 A1    Apr. 1, 2010

(30) Foreign Application Priority Data

Sep. 18, 2008    (NL) ....................................... 2001993

(51) Int. Cl.
*A22C 17/02*      (2006.01)
*A22C 21/00*      (2006.01)
(52) U.S. Cl.
CPC ................................. *A22C 21/0069* (2013.01)
USPC .......................................... 452/136; 452/165
(58) Field of Classification Search
USPC ......... 452/127, 135, 136, 149, 150, 155, 156, 452/165, 171, 172
See application file for complete search history.

(56) References Cited

U.S. PATENT DOCUMENTS

| 4,648,156 | A | * | 3/1987 | Meyn ............................ 452/136 |
| 4,682,386 | A | * | 7/1987 | Hazenbroek et al. ......... 452/136 |
| 4,951,354 | A | * | 8/1990 | Callsen et al. ................ 452/136 |
| 5,314,374 | A | * | 5/1994 | Koch et al. .................... 452/136 |
| 5,372,539 | A | * | 12/1994 | Kunig et al. ................... 452/136 |
| 5,407,383 | A | * | 4/1995 | Diesing et al. ................ 452/169 |
| 5,466,185 | A | * | 11/1995 | Martin et al. ................. 452/165 |
| 5,697,837 | A | * | 12/1997 | Verrijp et al. ................. 452/170 |
| 5,833,527 | A | * | 11/1998 | Hazenbroek et al. ......... 452/170 |
| 6,283,847 | B1 |  | 9/2001 | Berry et al. |
| 6,935,942 | B1 | * | 8/2005 | Evers et al. ................... 452/157 |

FOREIGN PATENT DOCUMENTS

| DE | 41 05 564 A1 | 8/1992 |
| EP | 0 447 773 A1 | 9/1991 |
| EP | 0 800 768 A1 | 10/1997 |
| NL | 1033604 | 9/2008 |
| WO | 2008/118008 | 10/2008 |

OTHER PUBLICATIONS

Search Report for NL 2001993, dated Apr. 9, 2009.

* cited by examiner

*Primary Examiner* — David Parsley
(74) *Attorney, Agent, or Firm* — Dority & Manning, P.A.

(57)    ABSTRACT

The invention relates to a method for processing poultry or a part thereof in a processing line, including the step of detaching and/or collecting a cartilage of the poultry's keel bone, whereby during transport of the poultry's carcass in the processing line, a cut is made in the cartilage of the keel bone, which cut is made initially transverse to the transport direction of the poultry and towards the poultry's backbone, and which cut develops from said transverse direction to eventually a direction opposed to the transport direction.

15 Claims, 12 Drawing Sheets

METHOD AND APPARATUS FOR PROCESSING POULTRY OR A PART THEREOF

FIELD OF THE INVENTION

The invention relates to a method and to an apparatus for processing poultry or a part thereof, including the step of detaching and/or collecting a cartilage of the poultry's keel bone.

BACKGROUND OF THE INVENTION

In the poultry industry virtually nothing goes to waste. There is an ongoing pressure on machine-developers to devise machines and methods in which to the greatest possible extent parts from the poultry's carcass that have an appreciable commercial value are harvested.

It is the object of this invention to provide a method and an apparatus in which parts of the poultry may be harvested to a greater extent and with improved integrity as to its constitution free from alien parts so that the parts that get harvested exhibit the largest possible commercial value.

As is common in the art, use is made in this method and apparatus of a carrier for the poultry's carcass, which carrier moves the carcass along a processing line that is provided with detaching means for a cartilage of the poultry's keel bone. Such a method and apparatus are known from U.S. Pat. No. 6,283,847.

SUMMARY OF THE INVENTION

Objects and advantages of the invention will be set forth in part in the following description, or may be obvious from the description, or may be learned through practice of the invention.

In the processing line of the invention harvesting operations are carried out and apparatus features are employed all consistent with one or more of the appended claims.

From a commercial point of view it has been found considerably rewarding that when detaching and/or collecting a cartilage of the poultry's keel bone, such is carried out during transport of the poultry's carcass by making a cut in the cartilage of the keel bone, which cut develops from the transverse direction to eventually a direction opposed to the transport direction. This allows the cartilage of the keel bone to be harvested without being spoiled by other parts of the keel bone or the carcass, allowing the highest commercial value of the cartilage to be realized.

The just mentioned method can effectively be carried out in an apparatus which is provided with detaching means for the cartilage of the poultry's keel bone, which detaching means comprises a knife that is movable towards and from a path that the carrier follow in the processing line.

Particularly in the case the poultry's carcass is supported by a carrier, having the neck-side pointed in the transport direction, it is preferable that the knife is moveable towards and from said path depending on the carrier's position in the processing line. Thus, the operation of the apparatus can be attuned to the part of the poultry's keel bone where the cartilage is located. More precisely, during use, the knife moves towards the path of the carrier, when the carrier is in a position such that the knife cuts the keel bone of the poultry supported by the carrier exclusively at the cartilage of the keel bone, avoiding the part of the keel bone adjacent to the cartilage.

The knife can be of any shape or form; it can for instance be shaped as a band-saw.

Preferably, however, the knife has a cross-section that is shaped with a bend, which knife has a cutting edge at the extremity of the bend, and which knife is rotatable so as to cause the cutting edge to be movable to and from the path that the carrier follows in the processing line.

With such a knife high processing rates are possible, which answers to today's needs of high speed processing lines.

Even in such high speed processing lines it is possible to harvest the cartilage of the keel bone exclusively, without remainders of other parts of the carcass, by having the knife rotatable to said path of the carrier up to a position at which said cutting edge of the knife points into a direction opposite to the transport direction of the carrier.

Best results are achieved when the knife has a centre of rotation which lies externally from the body of said knife, whereby the knife exhibits an inner surface that occupies an approximately constant distance to said centre of rotation.

The step of harvesting a part of the poultry's carcass in accordance with the invention may include further a step selected from the group of processing steps, including detaching and/or collecting the poultry's membrane of the keel bone and/or scraping and/or collecting residual meat from the sides of the poultry's keel bone.

The method of the invention may to this end be advantageously employed in an apparatus that is provided with detaching means for the poultry's membrane of the keel bone, wherein the detaching means includes a cutting instrument having a cutting edge pointing opposite to the transport direction at a level coinciding, during use, with a frontal extremity of the poultry's keel bone, and which cutting instrument has adjacent to it catching means for gripping the membrane of the keel bone and tearing the same loose therefrom.

This apparatus makes possible that during transport of the poultry's carcass an initial cut is made in a frontal part of the keel bone, so as to cut the membrane loose from the keel bone thereunder, whereafter the membrane is caught and stripped from the carcass. This effectively assists and promotes the ease of harvesting the cartilage of the keel bone thereafter.

The catching and stripping of the membrane from the carcass is particularly effectively carried out when the catching means comprises a roller and a wedge that is shaped to follow circumferentially at least part of said roller's surface so as to leave a nip between said roller's surface and the wedge sufficient to receive said membrane.

It is then further advantageous that the roller has teeth located circumferentially. Thus, the membrane can be caught effectively by the teeth of the roller and maintained in place in the nip between the roller's surface and the wedge that follows the roller's contour.

A further desirable embodiment of the apparatus of the invention is having scraping means for collecting residual meat from the sides of the poultry's keel bone, which scraping means comprise scrapers on opposite sides of a path that the carrier follows in the processing line, and the scrapers are movable to and from the path.

Advantageously, the scrapers are flexible and/or are resiliently supported, and when moved towards the path of the carrier are capable to press on opposite sides of the keel bone of a poultry's carcass, supported by the carrier. Practice has shown that this effectively removes the essence of the residual flesh on both sides of the keel bone.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

The invention will hereinafter be further elucidated with reference to a schematic exemplary embodiment as illustrated with reference to the attached drawing.

In the drawing

FIG. 1 shows the processing line embodied with an apparatus or apparatuses according to the invention;

FIG. 2-FIG. 5 show the operation of an apparatus according to the invention for detaching and/or collecting a poultry's membrane of the keel bone;

FIG. 6-FIG. 8 show the operation of an apparatus according to the invention for scraping and/or collecting residual meat from the sides of the poultry's keel bone and FIG. 9-FIG. 12 show schematically the method of detaching and/or collecting a cartilage part of the poultry's keel bone with an apparatus according to the invention.

Wherever in the figures the same reference numerals are applied, these relate to the same parts.

DETAILED DESCRIPTION OF THE INVENTION

Figure 1:
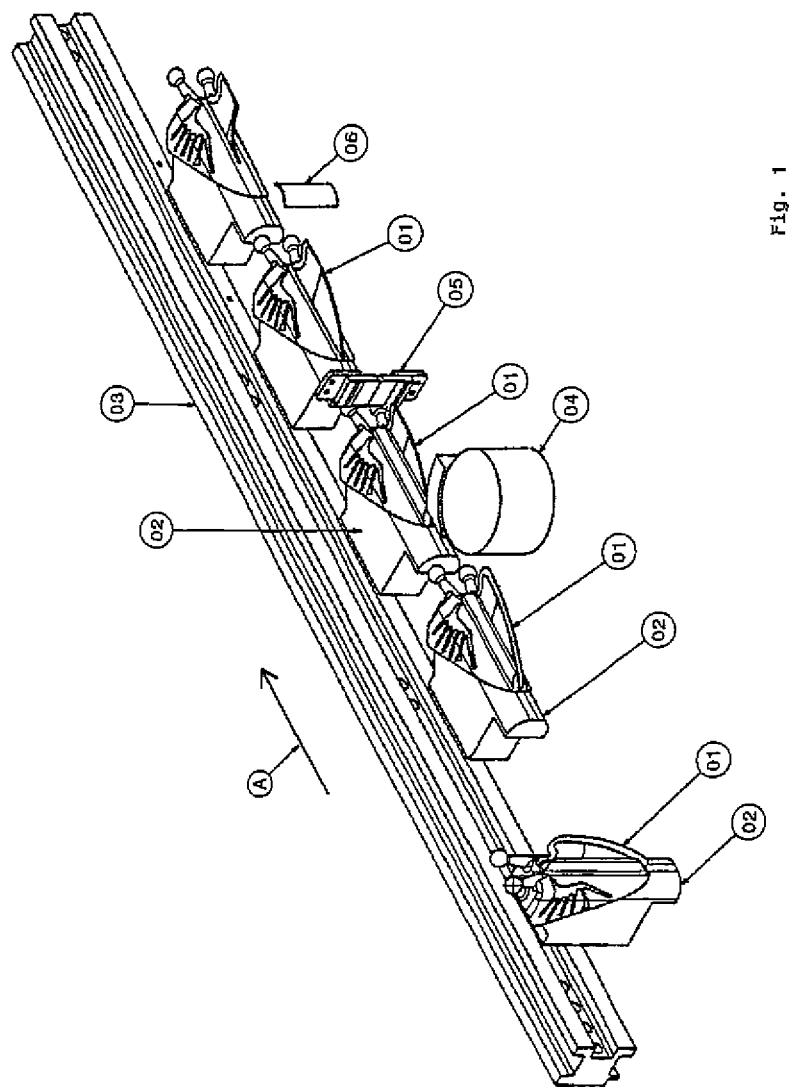

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

With reference first to FIG. 1, several poultry's carcasses 1 are shown as supported in a manner known per se to the person skilled in the art by carriers 2 that move the poultry's carcasses 1 in a transport direction A along a processing line 3.

The processing line 3 is provided with harvesting means 4, 5, 6, that operate or are intended to operate on a part or parts of the poultry's carcass 1.

The harvesting means 4, 5, 6, are selected from the group that includes detaching means 4 for the poultry's membrane of the keel bone scraping means 5 for collecting residual meat from the sides of the poultry's keel bone detaching means 6 for a cartilage of the poultry's keel bone.

It is specifically remarked that although the just mentioned detaching means 4, scraping means 5 and detaching means 6 are shown to be separate apparatus parts or apparatuses, they can be suitably embodied in a single apparatus as well without departing from the spirit and scope of the invention.

The harvesting means 4, 5, 6, for a part of the poultry's carcasses 1 are preferably embodied in accordance with the following elucidation.

With reference first to FIG. 2-FIG. 8, the operation and basic construction of the detaching means 4 for the poultry's membrane of the keel bone is shown.

Figure 2:
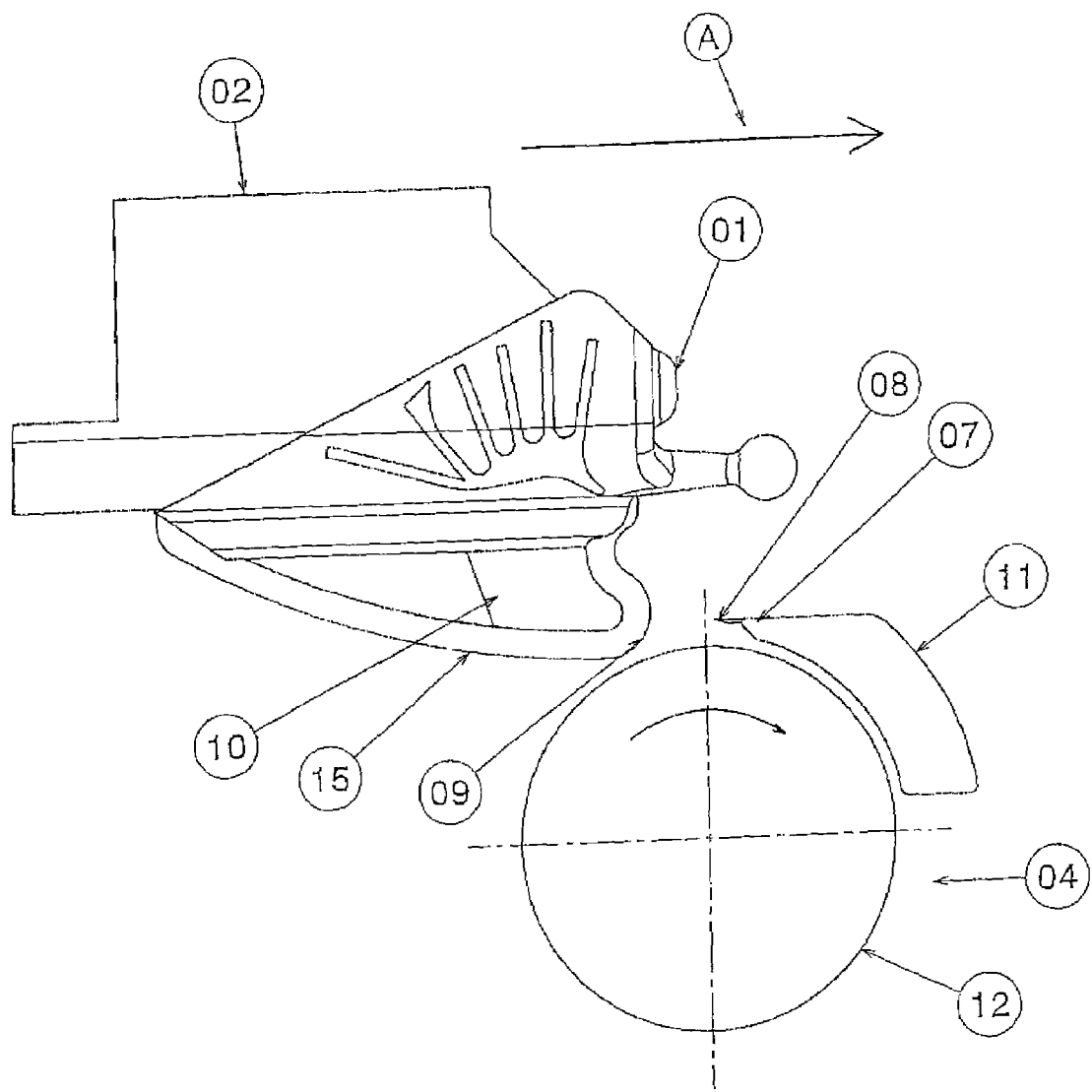

FIG. 2 shows a carcass 1 as it is transported in the transport direction (arrow A) and supported by a carrier 2.

The detaching means 4 includes a cutting instrument 7 having a cutting edge 8 pointing opposite to the transport direction A at a level that, during use, coincides with a frontal extremity 9 of the poultry's keel bone 10. The cutting instrument 7 further has adjacent to it catching means 11, 12, for gripping the membrane 15 of the keel bone 10 and tearing the membrane 15 loose from the keel bone 10.

Due to the cut effected by the cutting edge 8 of the cutting instrument 7, the membrane 15 of the keel bone 10 is detached from the keel bone 10, whereafter it can be completely removed by the operation of the catching means 11, 12.

Figure 3:
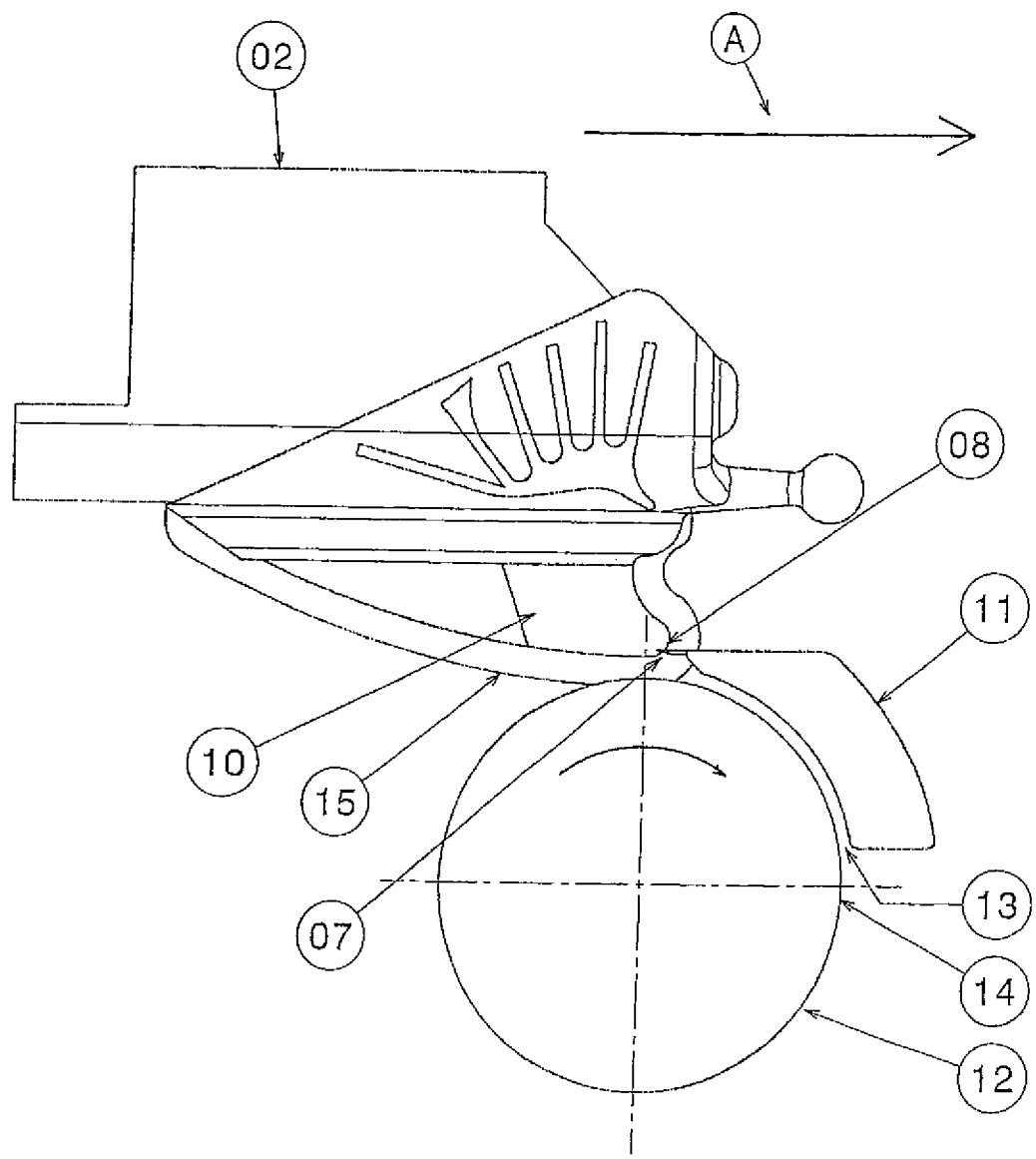

The catching means 11, 12, preferably includes a roller 12 and a wedge 11 that is shaped to follow circumferentially at least part of the roller's surface 14, so as to leave a nip 13 as shown in FIG. 3 between the surface 14 of the roller 12 and the wedge 11, which is sufficient to receive the membrane 15 detached from the keel bone 10.

Figure 4:
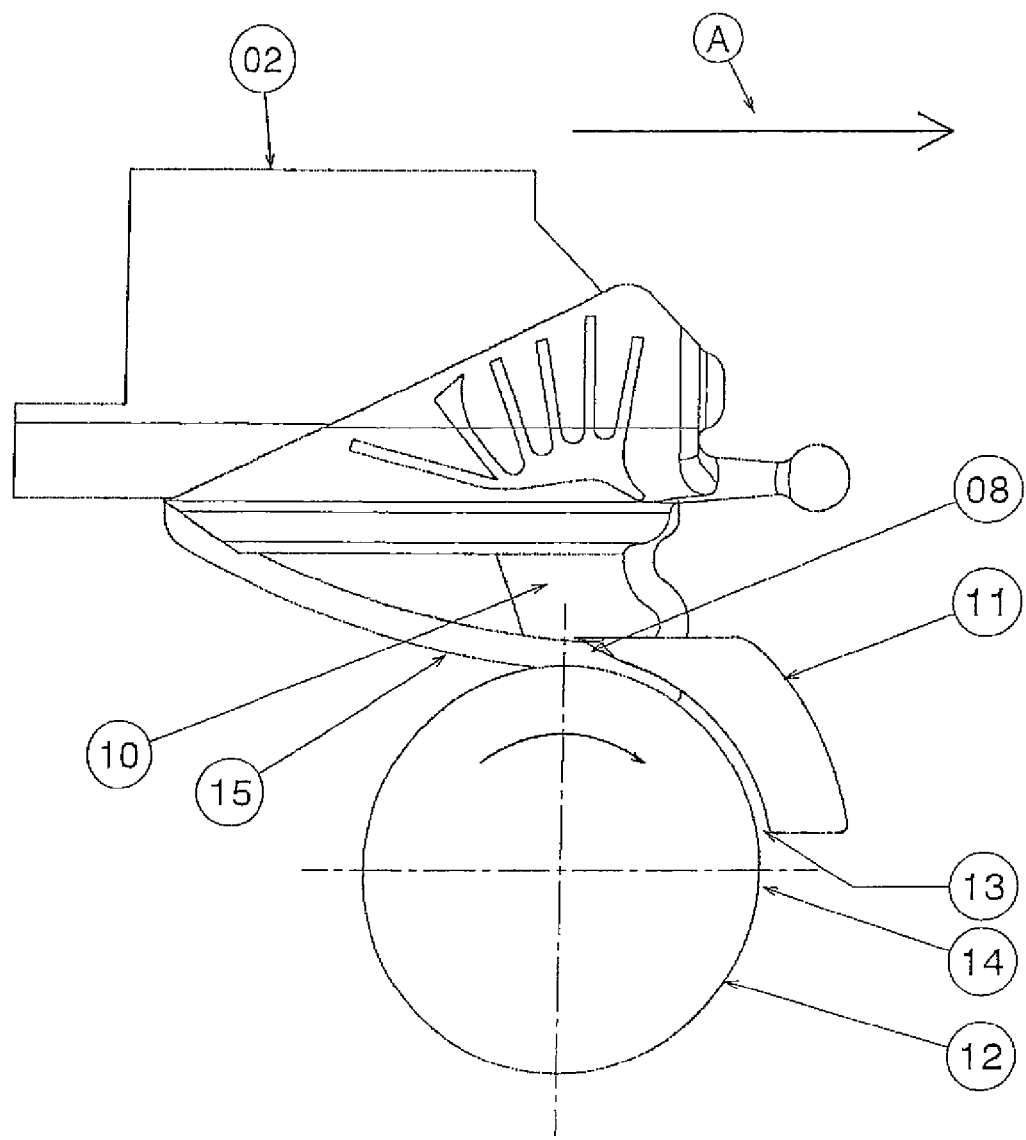

FIG. 3 shows the initial making of the cut by the cutting edge 8 of the cutting instrument 7, and FIG. 4 shows how subsequently the membrane 15 is caught in the nip 13 between the surface 14 of the roller 12 and the wedge 11.

In order to support the membrane 15 that is effectively torn loose from the carcass 1, the roller 12 preferably has circumferentially located teeth. Since it is completely clear how this should be embodied, the teeth are not further shown in the drawing of FIG. 2-FIG. 5.

Figure 5:
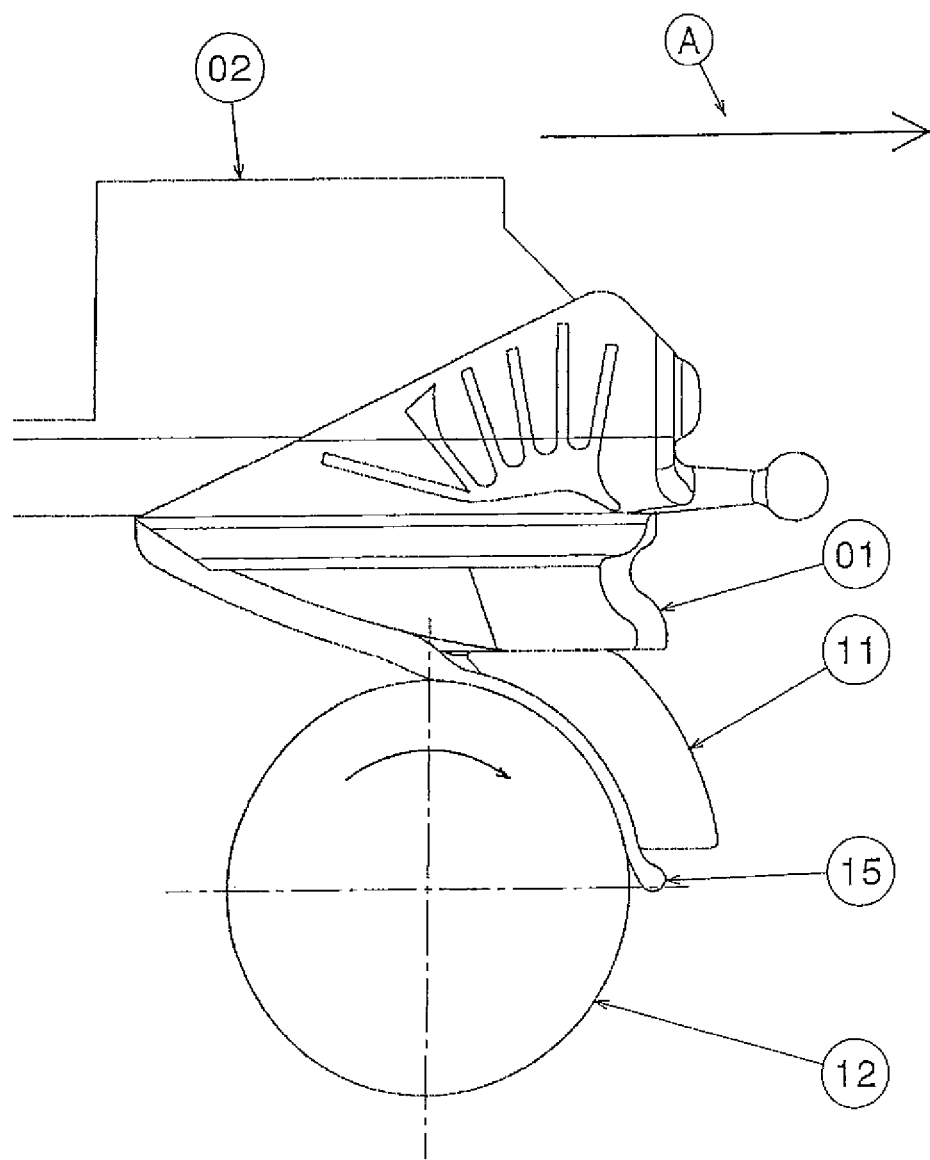

FIG. 5 shows that eventually, due to the continued rotation of the roller 12, the membrane 15 is entirely loosened and collected from the carcass 1 that continues its movement in the transport direction A.

Figure 6:
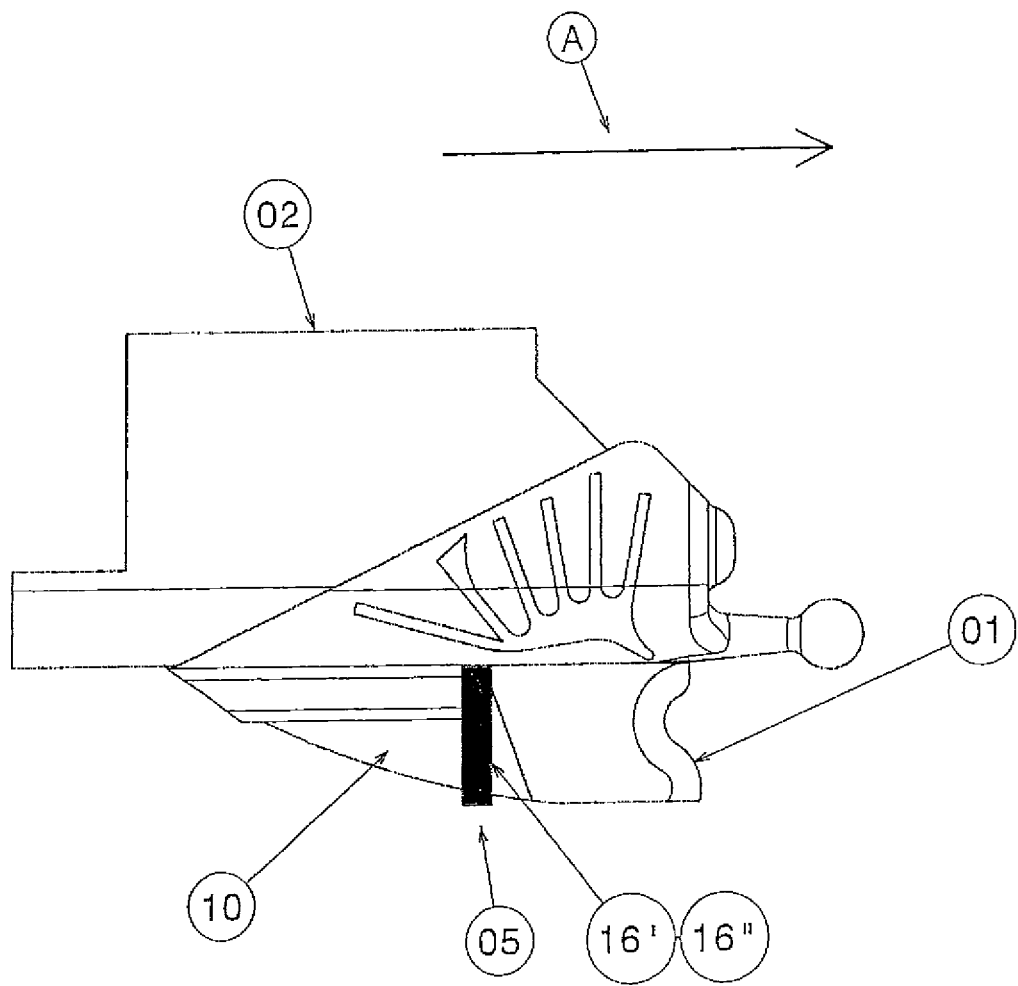
Figure 7:
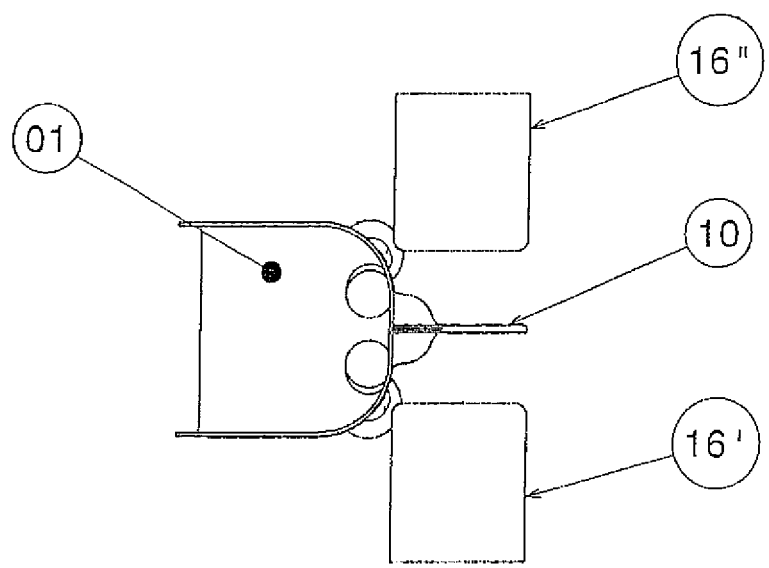
Figure 8:
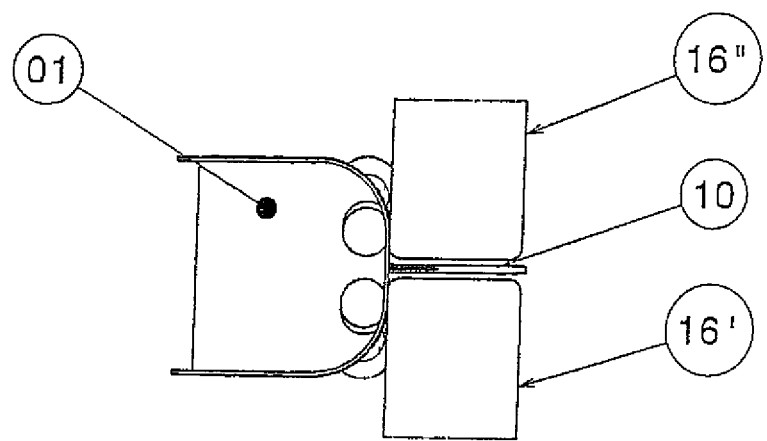

With reference now to FIG. 6-FIG. 8, the scraping means are shown that are used for the subsequent collecting of residual meat from the sides of the poultry's keel bone 10.

The scraping means 5 comprise scrapers 16', 16", as can be best seen in FIG. 7 which is a view in the transport direction A, as shown in FIG. 6.

In FIG. 7 the scrapers 16', 16", are shown at a relatively distant position as compared to the path that the carrier that supports the poultry's carcass 1 is following, which path essentially coincides with the route of the keel bone 10.

FIG. 8 shows in comparison with FIG. 7 that the scrapers 16', 16", are movable. In FIG. 8 the scrapers 16', 16" are moved towards the path that the carrier 2 follows in the processing line. In FIG. 8 the scrapers 16', 16", are pressed against opposite sides of the keel bone 10 such that as a result of the continued movement of carcass 1 in the transport direction A (see FIG. 6) the residual meat on the keel bone 10 is effectively removed such that it can be collected in, for instance, a bin provided below the scrapers 16', 16", due to the operation of gravity.

It is preferable that the scrapers 16', 16", are flexible. Advantageously the scrapers 16', 16", may be made of rubber.

Alternatively or in addition, the scrapers 16', 16", may be resiliently supported on a chassis and as mentioned before, when the scrapers 16', 16" are moved towards the path of the carrier 2, the scrapers must be capable to press on opposite sides of the keel bone 10 of a passing poultry's carcass 1.

With reference now to FIG. 9-FIG. 12, the operation of the apparatus according to the invention for subsequently detaching and/or collecting a cartilage of the poultry's keel bone 10 is elucidated.

Figure 9:
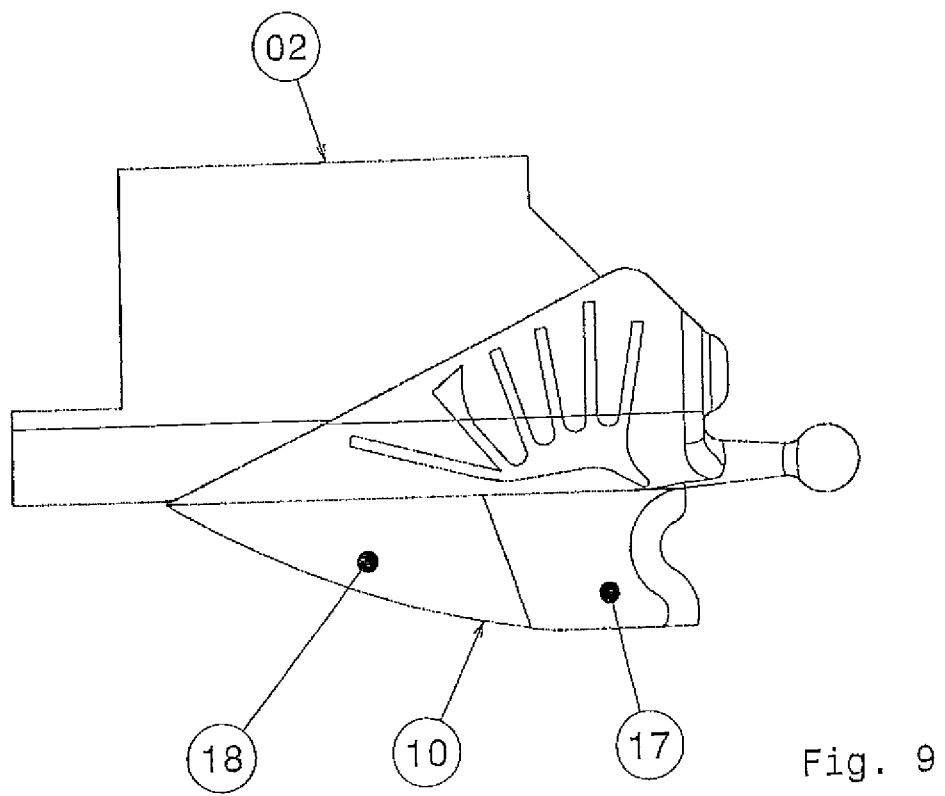

With reference first to FIG. 9, it is shown that the keel bone 10 includes a remaining part 17 of the keel bone 10 and the cartilage 18, which is intended to be harvested from the keel bone 10.

Figure 10:
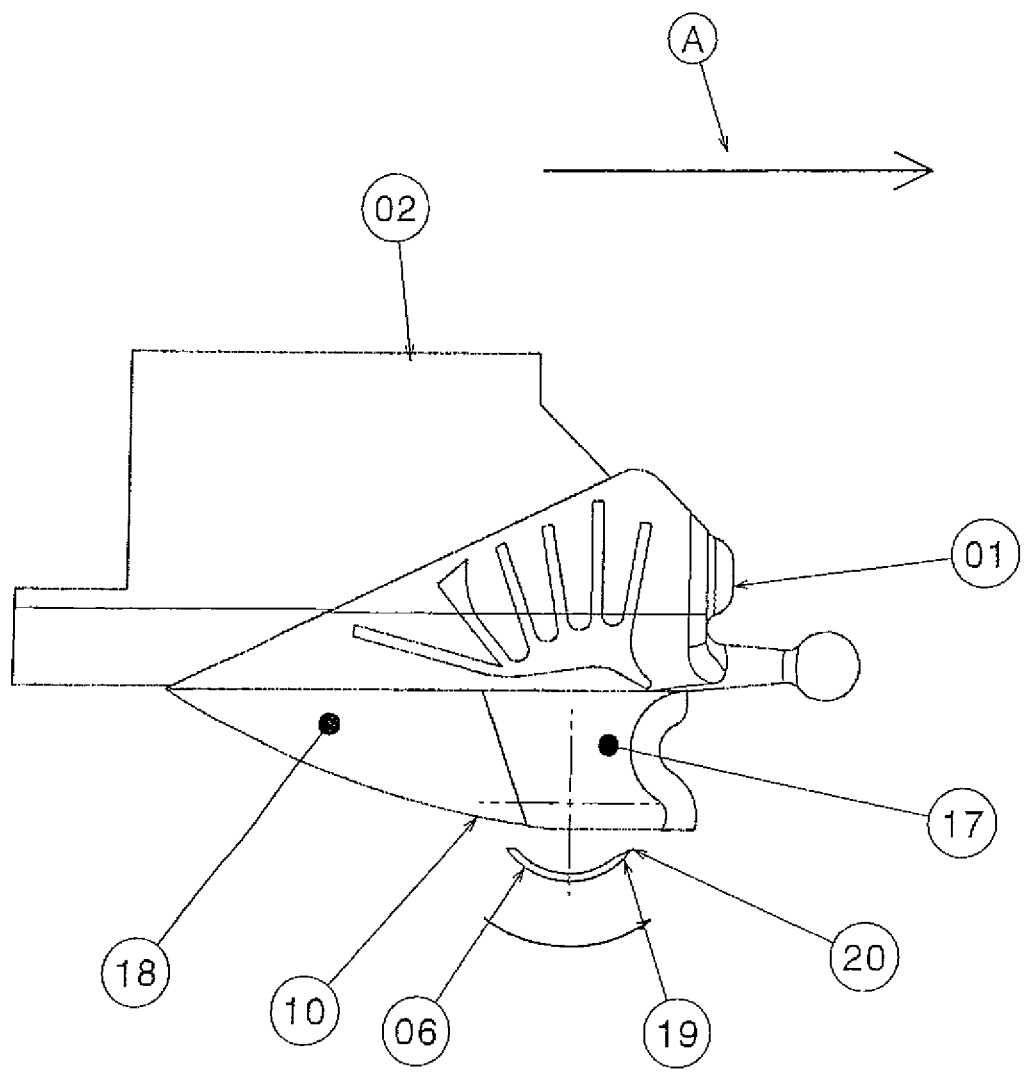

FIG. 10 shows that the detaching means 6 for the cartilage 18 of the poultry's keel bone 10 includes a knife 19 that is movable towards and from the path that the carrier with the carcass 1 follows in the transport direction A of the processing line.

In order to only harvest the cartilage 18 while the carcass 1 moves in the transport direction A, the knife 19 is movable towards and from the path that the carrier with the carcass 1 follows in the transport direction depending on the carrier's position in the transport direction A. This way the knife 19 will only move towards the carcass 1 when the carrier 2 is in a position such that the knife 19 cuts the keel bone 10 of the poultry supported by the carrier exclusively at the cartilage 18 of the keel bone 10.

FIG. 10 shows the poultry's carcass 1 supported by a carrier 2 in a position that the knife 19 has not yet moved in the direction of the carcass 1; movement of the knife 19 is delayed up to the moment that the cartilage 18 is in front of the cutting edge 20 of the knife 19, such that immediately when possible after passing of the remaining part 17 of the keel bone 10, the cartilage 18 is cut loose from the keel bone 10.

Figure 11:
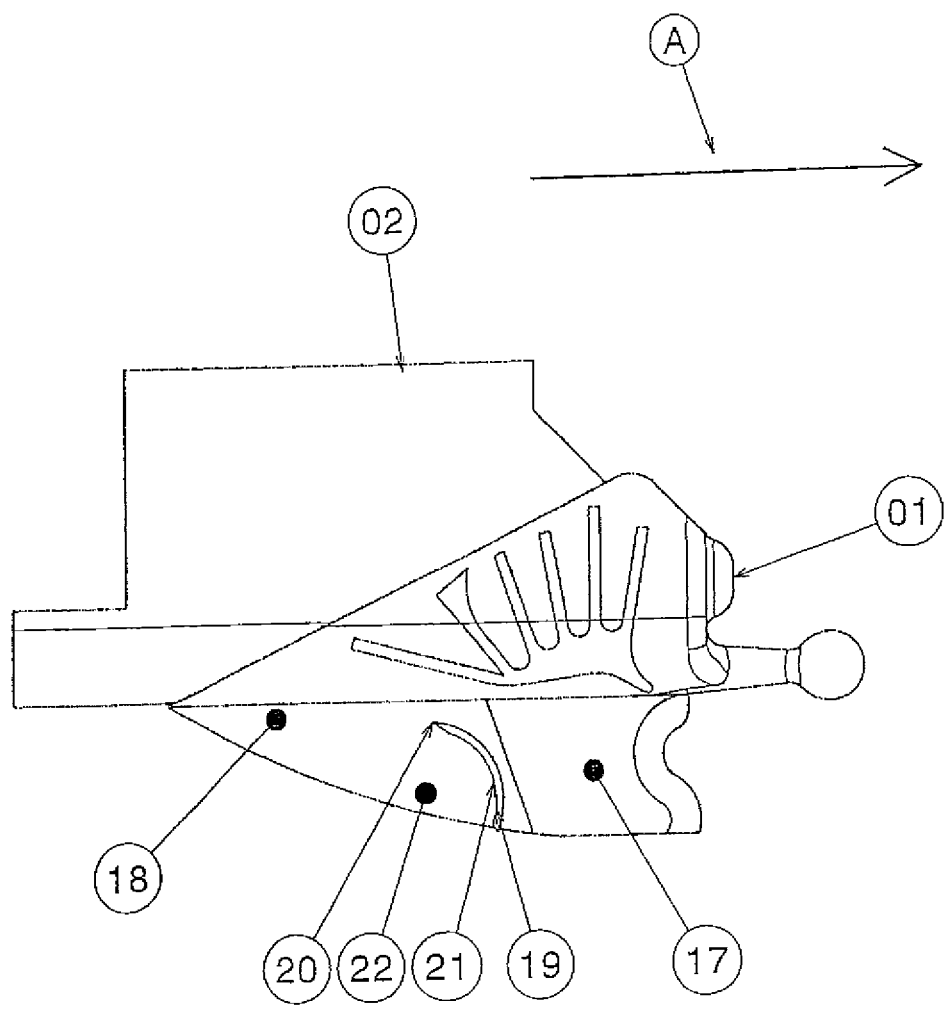

As FIG. 10 and FIG. 11 show in sequence, a very beneficial arrangement of the knife 19 is to have a cross-section being shaped with a bend wherein the cutting edge 20 is at an extremity of the bend and whereby the knife 19 is rotatable.

The knife 19 has a centre of rotation 22 which lies externally from the knife's body, whereby the knife 19 has an inner surface 21 that along its circumferential area exhibits a constant distance to the centre of rotation 22. This causes the cutting edge 20—when moved into the path that the carrier 2 with the poultry 1 follows in the transport direction A of the processing line—to result in a cut that develops from a transverse cut with reference to the transport direction, to eventually a direction as shown in FIG. 11, being opposed to the transport direction A.

Figure 12:
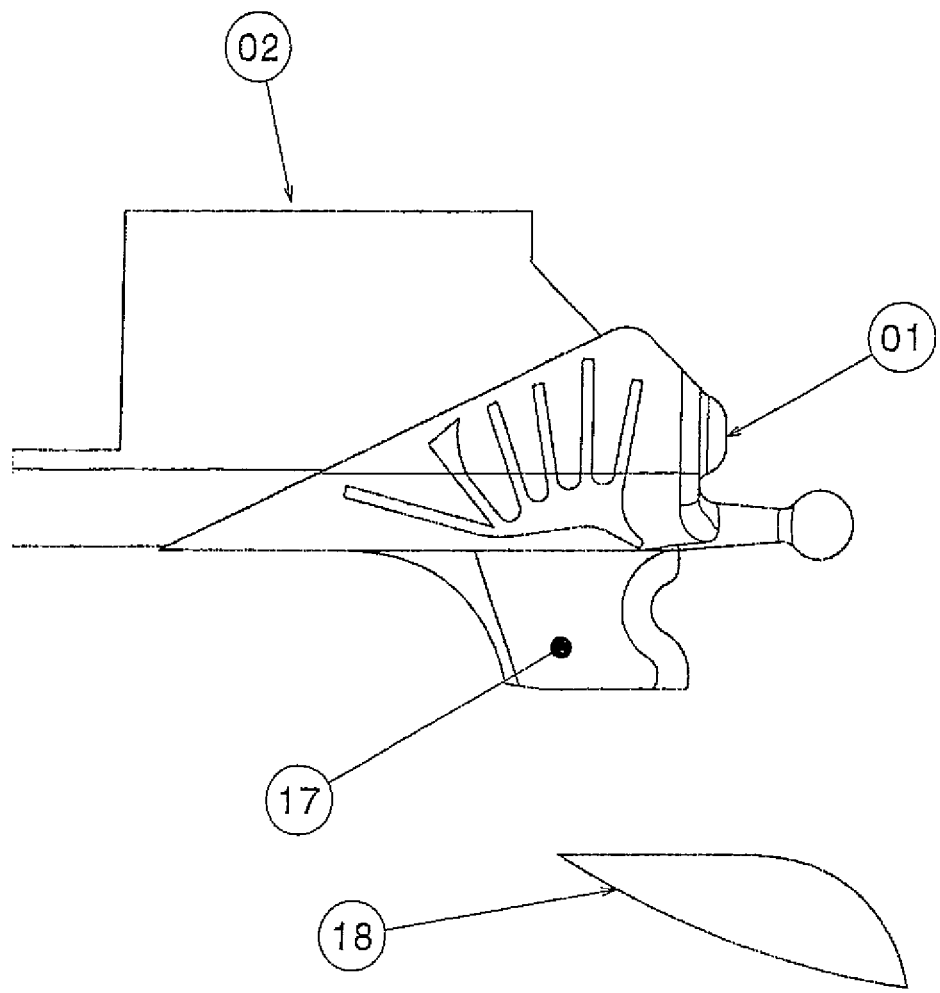

FIG. 12 show that thus a fairly complete removal and collection of the cartilage 18 that is adjacent to the remaining part 17 of the keel bone 10 can be effected. FIG. 12 finally shows in the right hand corner the removed and collected cartilage 18 taken from the keel bone 10 of the carcass 1 as explained hereinabove.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

The invention claimed is:

1. An apparatus for processing poultry or a part thereof, the poultry having a carcass that includes a keel bone having a frontal extremity, the apparatus comprising:
    a carrier for moving a poultry carcass in a transport direction along a path of a processing line, said carrier configured for holding the poultry, said frontal extremity of the keel bone disposed at a forward end of the carrier such that said frontal extremity faces the transport direction as the carrier and keel bone move along said path;
    a membrane detaching means positioned adjacent to the transport direction of said carrier, said membrane detaching means comprising
        a cutting edge positioned at a level that coincides with a level of the frontal extremity of the poultry's keel bone, said cutting edge pointing opposite the transport direction of said carrier; and
    a catching means positioned adjacent to said membrane detaching means, said catching means comprising
        a wedge positioned near said cutting edge; and
        a roller positioned adjacent to said wedge;
            wherein said wedge and said roller define a nip configured for receipt of a membrane detached from the keel bone.

2. An apparatus for processing poultry or a part thereof as in claim 1, wherein at least part of said wedge is shaped in a manner that is similar to the circumference of said roller.

3. An apparatus for processing poultry or a part thereof as in claim 1, wherein said roller has a plurality of circumferentially located teeth.

4. An apparatus for processing poultry or a part thereof as in claim 1, wherein said roller is configured for rotation in a direction that will pull the membrane into the nip during operation of the apparatus.

5. An apparatus for processing poultry or a part thereof as in claim 4, wherein said roller rotates in a direction that would pull the membrane into the nip defined by said wedge and said roller.

6. An apparatus for processing poultry or a part thereof as in claim 1, further comprising:
    scraping means positioned at a level that substantially coincides with the level of the poultry carcass transported by the carrier, said scraping means comprising:
        a pair of scrapers, said scrapers positioned on opposites sides of the path of said carrier, the scrapers configured for movement in directions towards and away from said path.

7. An apparatus for processing poultry or a part thereof as in claim 6, wherein said scrapers are configured for movement into a position where said scrapers can press on opposite sides of the keel bone as the carcass is transported by said carrier past said scrapers, whereby said scrapers can collect residual meat from the sides of the keel bone.

8. An apparatus for processing poultry or a part thereof as in claim 7, wherein said scrapers comprise a flexible material.

9. An apparatus for processing poultry or a part thereof as in claim 1, further comprising:
    a cartilage detaching means for removing cartilage from the poultry's keel bone, said detaching means comprising:
        a knife that is synchronized with the movement of said carrier such that at a time when said carrier transports the poultry over said knife, said knife rotates from a position below the path of said carrier to a position where said knife intersects the path of movement of the poultry and cuts the keel bone of the poultry at the cartilage of the keel bone.

10. An apparatus for processing poultry or a part thereof as in claim 9, wherein said knife rotates in a plane that is parallel to the path of movement of said carrier.

11. An apparatus for processing poultry or a part thereof as in claim 9, wherein said knife is configured with a cutting edge that initially points in the transport direction of said carrier and then points opposite to the transport direction of said carrier after rotating to enter the path of movement of said carrier.

12. An apparatus for processing poultry or a part thereof as in claim 9, wherein said knife has an arcuate bend with a cutting edge at an extremity of the bend.

13. An apparatus for processing poultry or a part thereof as in claim 8, wherein said flexible material is rubber.

14. An apparatus for processing poultry or a part thereof, the poultry having a carcass that includes a keel bone having a frontal extremity and a cartilage, the apparatus comprising:
- a carrier for moving a poultry carcass in a transport direction along a path of a processing line, said carrier configured for holding the poultry with the frontal extremity of the keel bone disposed at a forward end of the carrier such that said frontal extremity faces the transport direction as the carrier and keel bone move along said path;
- a membrane detaching means for detaching a membrane from said keel bone, the membrane detaching means comprising
  - a cutting edge, the cutting edge positioned at a level that coincides with the frontal extremity of the keel bone at a level sufficient to cut the membrane from the keel bone, said cutting edge pointing opposite the transport direction of said carrier;
  - a wedge positioned adjacent said cutting edge;
  - a roller positioned adjacent said wedge; and,
  - a nip defined by said wedge and said roller,
  - wherein said roller rotates in the transport direction to pull the membrane into the nip during operation of the apparatus; and,
- a cartilage detaching means for harvesting the cartilage from the keel bone, the cartilage detaching means comprising a knife that is synchronized with the movement of said carrier along said path such that said knife rotates from a position below the path to a position where said knife intersects the path and cuts the cartilage of the keel bone.

15. An apparatus for processing poultry or a part thereof as in claim 14, wherein the apparatus further comprises:
- scraping means positioned at a level that substantially coincides with the level of the poultry carcass transported by the carrier, said scraping means comprising:
  - a pair of scrapers, said scrapers positioned on opposites sides of the path of said carrier, the scrapers configured for movement in directions towards and away from said path.

* * * * *